(No Model.) 3 Sheets—Sheet 1.

H. C. BEHR.
ADJUSTABLE GEAR FOR CRUSHING ROLLS.

No. 409,095. Patented Aug. 13, 1889.

Witnesses:
Geo. H. Strong
J. H. Rouse

Inventor,
Hans C. Behr
By Dewey & Co.
attys (No Model.)   3 Sheets—Sheet 2.

H. C. BEHR.
ADJUSTABLE GEAR FOR CRUSHING ROLLS.

No. 409,095.   Patented Aug. 13, 1889.

Witnesses,
Geo. H. Strong
J. H. Rouse

Inventor,
Hans C. Behr
By Dewey & Co.
Attys (No Model.) 3 Sheets—Sheet 3.

H. C. BEHR.
ADJUSTABLE GEAR FOR CRUSHING ROLLS.

No. 409,095. Patented Aug. 13, 1889.

Witnesses,
Geo. H. Strong.

Inventor
Hans C. Behr
By Dewey & Co.
Attys

UNITED STATES PATENT OFFICE.

HANS C. BEHR, OF SAN FRANCISCO, CALIFORNIA, ASSIGNOR OF ONE-HALF TO BENJAMIN T. LACY, OF SAME PLACE.

ADJUSTABLE GEAR FOR CRUSHING-ROLLS.

SPECIFICATION forming part of Letters Patent No. 409,095, dated August 13, 1889.

Application filed March 9, 1889. Serial No. 302,677. (No model.)

*To all whom it may concern:*

Be it known that I, HANS CHARLES BEHR, of the city and county of San Francisco, State of California, have invented an Improvement in Adjustable Gears for Crushing-Rolls; and I hereby declare the following to be a full, clear, and exact description of the same.

My invention relates to the class of adjustable gears; and my invention consists in the hereinafter-described novel mechanism for varying the position of the gear on its shaft by adjusting it rotatively and holding it in the position to which it is adjusted.

The object of my invention is to provide for so moving or changing the position of the gear as to effect the accurate adjustment of the parts to be driven.

My improvement, though applicable to other machines which are driven by gears, is, for the sake of clearness, herein described in connection with a crushing-mill, to which it is specially applicable.

Figure 2:
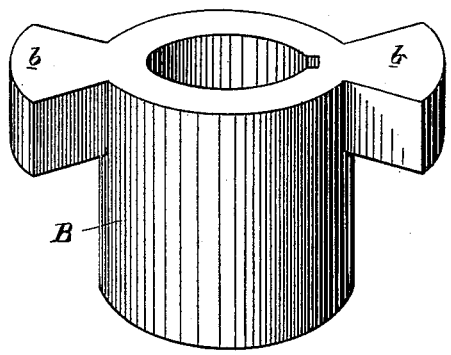
Figure 1:
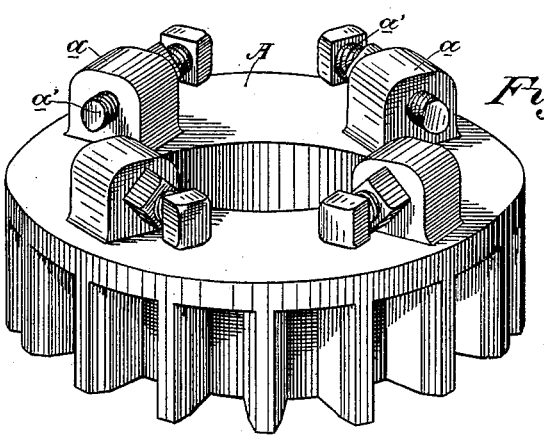
Figure 3:
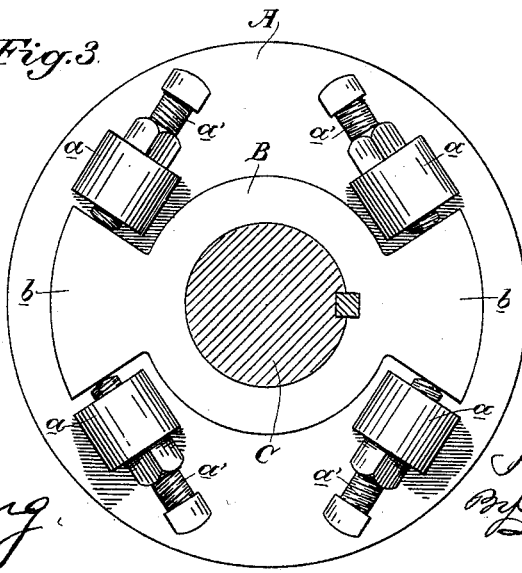
Figure 4:
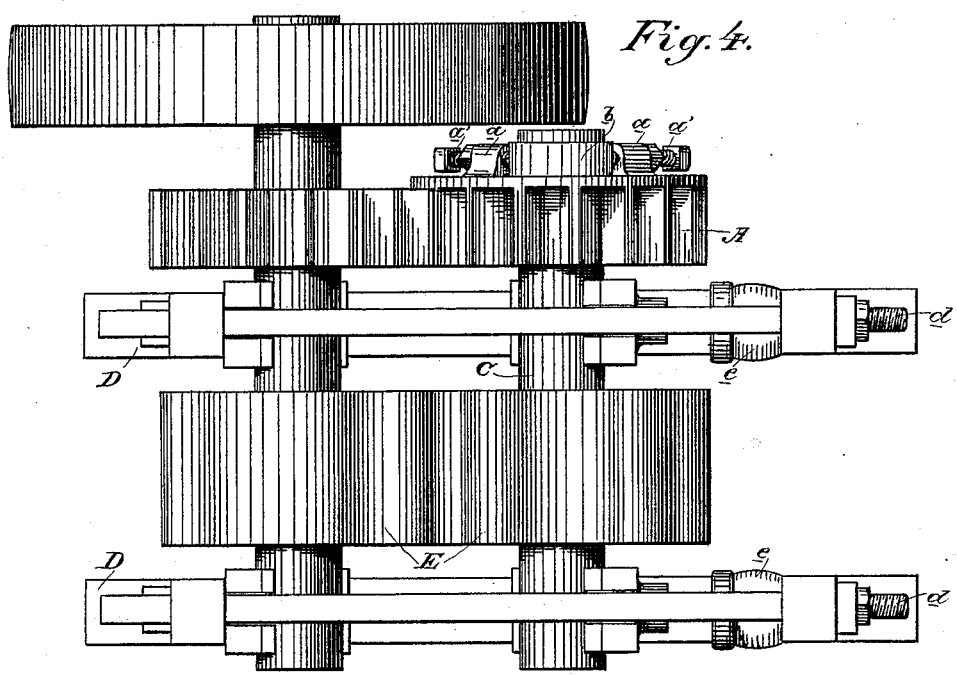
Figure 5:
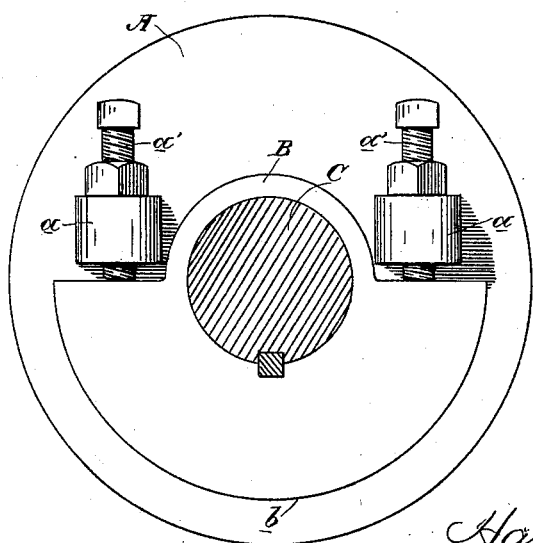
Figure 6:
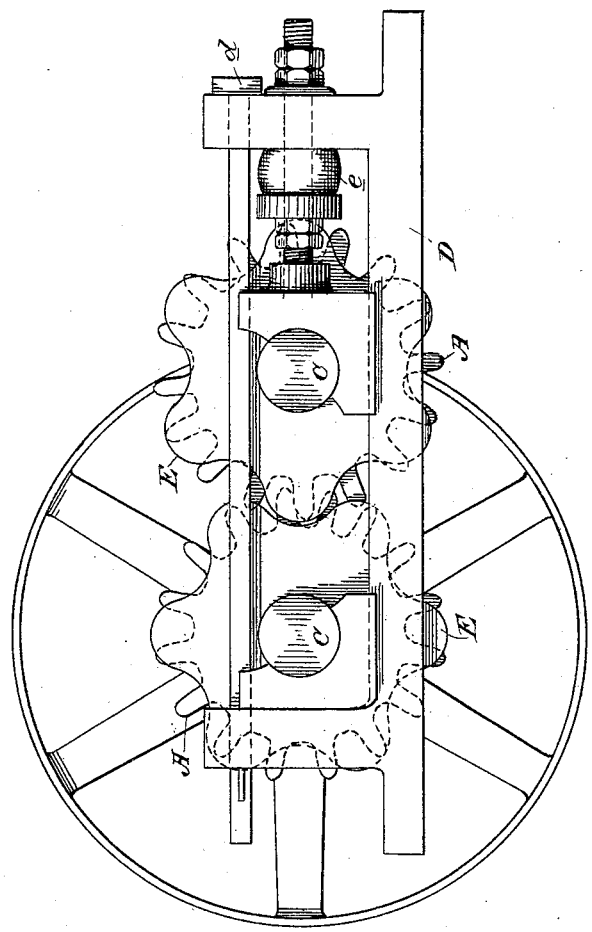

Referring to the accompanying drawings, Figure 1 is a perspective view of a gear, showing the lugs and set-screws upon its side. Fig. 2 is a perspective view of the hub, having the side projections against which the set-screws of the gear bear. Fig. 3 is a view showing the connection of the gear and hub mounted on the shaft. Fig. 4 is a view showing the application of my gear to a crushing-mill. Fig. 5 is a view showing a modification of my adjustable gear. Fig. 6 illustrates an end view of the crushing-roll.

A is a gear having formed or secured to its side the lugs $a$, through which pass the set-screw $a'$.

B is a hub, which has formed with or secured to it the projections $b$.

C is a shaft, to which the hub B is firmly keyed. The gear is fitted to this shaft either directly upon the shaft or upon the hub, but in such a position that the ends or its set-screws $a'$ fit on each side of and against the projection $b$ of the hub. By properly setting up and relieving these set-screws it is obvious that the gear may be adjusted rotatively, so as to bring it into the position desired. This adjustment of the gear is of advantage in many cases, and especially in the case of the crushing-mill shown in Fig. 4. In this figure, D is the frame of the mill, and $d$ are tie-bolts holding it together. The shafts C are suitably mounted in the frame and carry the crushing-rolls E. One of the shafts is mounted in sliding boxes, as shown, and is adapted to give against the cushions $e$, as is common in these mills. The crushing-mill to which I apply my invention has its rolls E formed with corrugated peripheries meshing into one another somewhat after the manner of gears.

In order to secure the most uniform size of crushing material, the rolls should in all positions of revolution present the same width of opening between the two corrugated crushing-surfaces. Where this is not the case the rolls are not in proper adjustment, and as a consequence the space varies, and the product therefore varies very much in the size of the particles. In order to overcome this difficulty, it has often been found necessary to refit gears on the roll-shafts in different positions by cutting other keyways or enlarging existing ones and introducing wider keys; but by my invention either one of the gears may be readily and accurately adjusted upon the roll-shaft and held in that position, so that the space between the rolls shall be uniform and the resulting product as desired.

In Fig. 5 I show a slight modification of my means for adjusting the gear, in which but two set-screws are used, which bear against the end of a single segmental projection upon the hub.

It is obvious that without changing the character of my invention the set-screws might be carried by the shaft or the part keyed to the shaft, and the projections against which the set-screws bear might be carried by the gear. This would be a mere reversal of parts.

Having thus described my invention, what I claim as new, and desire to secure by Letters Patent, is—

1. In combination with the corrugated rolls of the crushing-mill, a gear on the roll-shaft adjustable rotatively on said shaft, substantially as described.

2. In combination with the corrugated rolls of the crushing-mill and their shafts, intermeshing gears mounted upon said shafts and the means for adjusting one of said gears rotatively upon the shaft, consisting of the set-screws mounted on the gear, and fixed projections carried by the shaft, against both sides of which the set-screws bear, substantially as described.

In witness whereof I have hereunto set my hand.

HANS C. BEHR.

Witnesses:
S. H. NOURSE,
H. C. LEE.